(12) United States Patent
Maheshwari et al.

(10) Patent No.: US 9,801,030 B2
(45) Date of Patent: Oct. 24, 2017

(54) INTERNAL DATA TRANSFER IN EMBMS RECEPTION

(71) Applicant: QUALCOMM Incorporated, San Diego, CA (US)

(72) Inventors: Shailesh Maheshwari, San Diego, CA (US); Kuo-Chun Lee, San Diego, CA (US); Sivaramakrishna Veerepalli, San Diego, CA (US); Jack Shyh-Hurng Shauh, San Diego, CA (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 14/800,267

(22) Filed: Jul. 15, 2015

(65) Prior Publication Data

US 2017/0019771 A1    Jan. 19, 2017

(51) Int. Cl.
*H04W 4/06* (2009.01)
*H04L 29/06* (2006.01)
(Continued)

(52) U.S. Cl.
CPC .............. *H04W 4/06* (2013.01); *H04L 69/12* (2013.01); *H04L 69/22* (2013.01);
(Continued)

(58) Field of Classification Search
CPC . H04L 65/4076; H04L 12/189; H04L 65/607; H04L 12/18; H04L 1/0057; H04L 65/60; H04N 21/8456; H04N 21/6405
(Continued)

(56) References Cited

U.S. PATENT DOCUMENTS 8,898,448 B2    11/2014 Klingenbrunn et al.
2013/0091514 A1*  4/2013 Ishii ..................... H04N 21/254
                                                             725/5
(Continued)

FOREIGN PATENT DOCUMENTS

WO    WO-2009158680 A1    12/2009

OTHER PUBLICATIONS

International Search Report and Written Opinion—PCT/US2016/033755—ISA/EPO—dated Sep. 13, 2016.
(Continued)

*Primary Examiner* — Charles C Jiang
*Assistant Examiner* — Will Lin
(74) *Attorney, Agent, or Firm* — Anthony R. Morris

(57) ABSTRACT

Resource and power savings in internal data transfer in enhanced multimedia broadcast-multicast service (eMBMS) is disclosed herein which may include receiving, by a modem processor of a mobile device, data packets of a data object from a broadcast-multicast service. The modem processor may buffer the received data packets without forwarding the buffered data packets to an application processor associated with the modem processor. The modem processor may also determine an end of a segment of the data object. The segment may indicate a period during which the data object is scheduled to be received by the modem processor. The modem processor may forward, in a single data burst, the buffered data packets to the application processor before the end of the segment.

24 Claims, 11 Drawing Sheets

(51) Int. Cl.
　　　*H04W 72/00*　　　(2009.01)
　　　*H04L 1/00*　　　　(2006.01)
　　　*H04W 4/00*　　　　(2009.01)
　　　*H04W 52/02*　　　(2009.01)
　　　*H04W 88/02*　　　(2009.01)

(52) U.S. Cl.
　　　CPC .......... *H04W 72/005* (2013.01); *H04W 4/003* (2013.01); *H04W 52/0209* (2013.01); *H04W 88/02* (2013.01); *Y02B 60/50* (2013.01)

(58) Field of Classification Search
　　　USPC ......................................................... 709/231
　　　See application file for complete search history.

(56) References Cited

U.S. PATENT DOCUMENTS

| | | | |
|---|---|---|---|
| 2013/0097287 A1* | 4/2013 | Shauh | H04L 65/605 709/219 |
| 2013/0215219 A1 | 8/2013 | Hefeeda et al. | |
| 2013/0254631 A1* | 9/2013 | Luby | H03M 13/356 714/776 |
| 2014/0192693 A1 | 7/2014 | Lee et al. | |
| 2014/0269482 A1 | 9/2014 | Pandey et al. | |
| 2015/0169037 A1 | 6/2015 | Kaushik et al. | |
| 2016/0218883 A1* | 7/2016 | Lee | H04L 67/06 |

OTHER PUBLICATIONS

Hefeeda M., et al., "On Burst Transmission Scheduling in Mobile TV Broadcast Networks," IEEE/ACM Transactions on Networking, 2009, pp. 610-623.

\* cited by examiner

INTERNAL DATA TRANSFER IN EMBMS RECEPTION

BACKGROUND

Field

Aspects of the present disclosure relate generally to wireless communication systems, and more particularly, to internal data transfer in enhanced multimedia broadcast-multicast service (eMBMS).

Background

Wireless communication networks are widely deployed to provide various communication services such as voice, video, packet data, messaging, broadcast, and the like. These wireless networks may be multiple-access networks capable of supporting multiple users by sharing the available network resources. Examples of such multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

Recent LTE versions support eMBMS in the LTE air interface to provide the video streaming and file download broadcast delivery. For example, video streaming service is expected to be transported by the DASH (Dynamic Adaptive Streaming using HTTP) protocol over FLUTE (File Delivery over Unidirectional Transport) as defined in IETF RFC 3926 over UDP/IP packets. File download service is transported by FLUTE over UDP/IP protocols. Higher layer protocols over IP are processed by the LTE broadcast channels in PHY and L2 (including MAC and RLC layers). However, such transport includes multiple inefficiencies which are not currently addressed in the communications industry.

SUMMARY

In one aspect of the disclosure, a method of wireless communication includes receiving, by a modem processor of a mobile device, data packets of a data object from a broadcast-multicast service, buffering, by the modem processor, the received data packets without forwarding the buffered data packets to an application processor associated with the modem processor, determining, by the modem processor, an end of a current segment of the data object, and forwarding, by the modem processor, in a single data burst, the buffered data packets to the application processor before the end of the current segment. In aspects, the current segment indicates a period during which the data object is scheduled to be received by the modem processor.

In an additional aspect of the disclosure, an apparatus configured for wireless communication includes means for receiving, by a modem processor, data packets of a data object from a broadcast-multicast service, means for buffering, by the modem processor, the received data packets without forwarding the buffered data packets to an application processor associated with the modem processor, means for determining, by the modem processor, an end of a current segment of the data object, and means for forwarding, by the modem processor, in a single data burst, the buffered data packets to the application processor before the end of the current segment.

In an additional aspect of the disclosure, a non-transitory computer-readable medium having program code recorded thereon includes program code for causing a computer to receive, by a modem processor, data packets of a data object from a broadcast-multicast service, to buffer, by the modem processor, the received data packets without forwarding the buffered data packets to an application processor associated with the modem processor, to determine, by the modem processor, an end of a current segment of the data object, and to forward, by the modem processor, in a single data burst, the buffered data packets to the application processor before the end of the current segment.

In an additional aspect of the disclosure, an apparatus configured for wireless communication includes at least one processor and a memory coupled to the processor. The processor is configured to receive, by a modem processor, data packets of a data object from a broadcast-multicast service, to buffer, by the modem processor, the received data packets without forwarding the buffered data packets to an application processor associated with the modem processor, to determine, by the modem processor, an end of a current segment of the data object, and to forward, by the modem processor, in a single data burst, the buffered data packets to the application processor before the end of the current segment.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
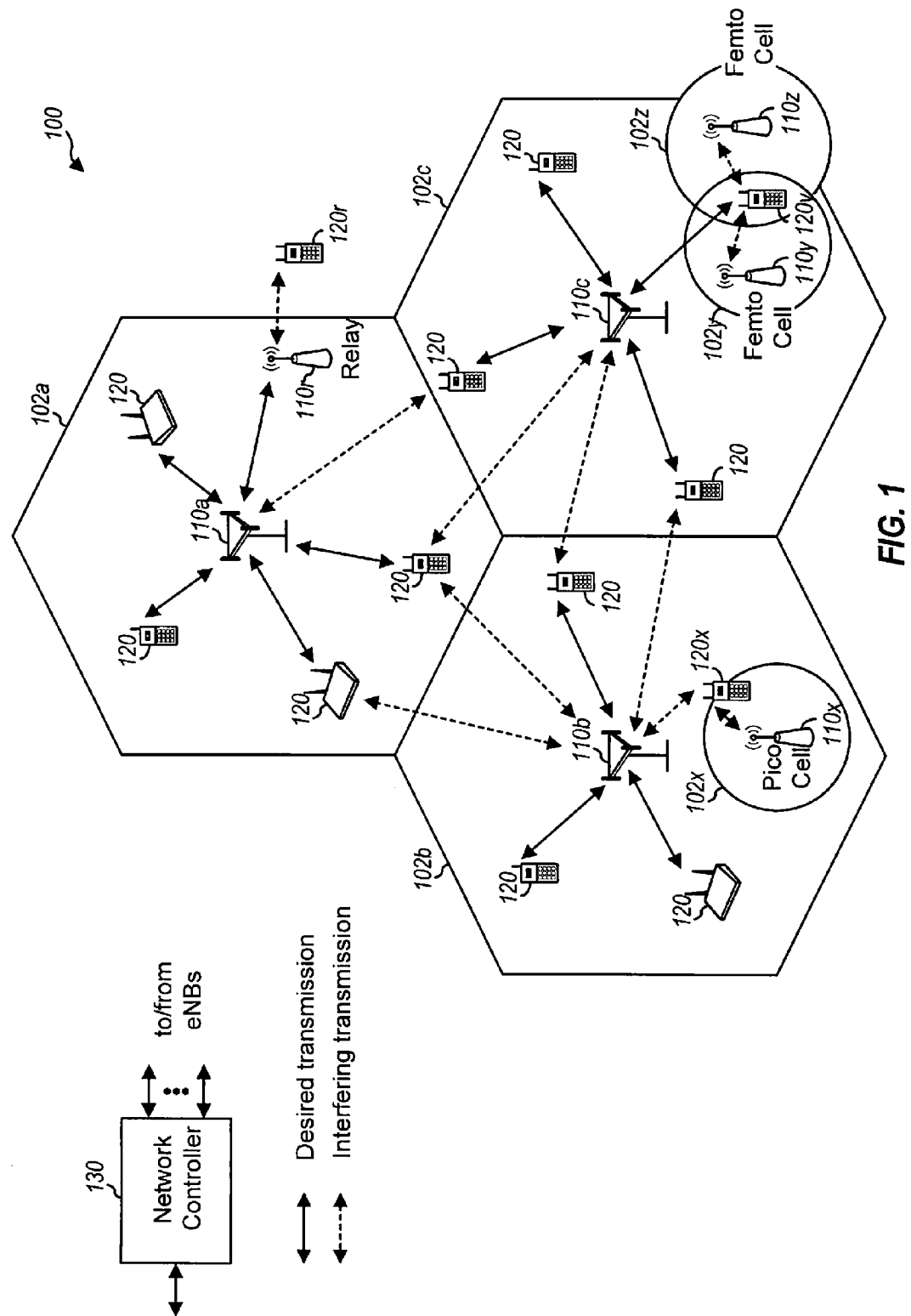
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a tablet, or other mobile entity. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
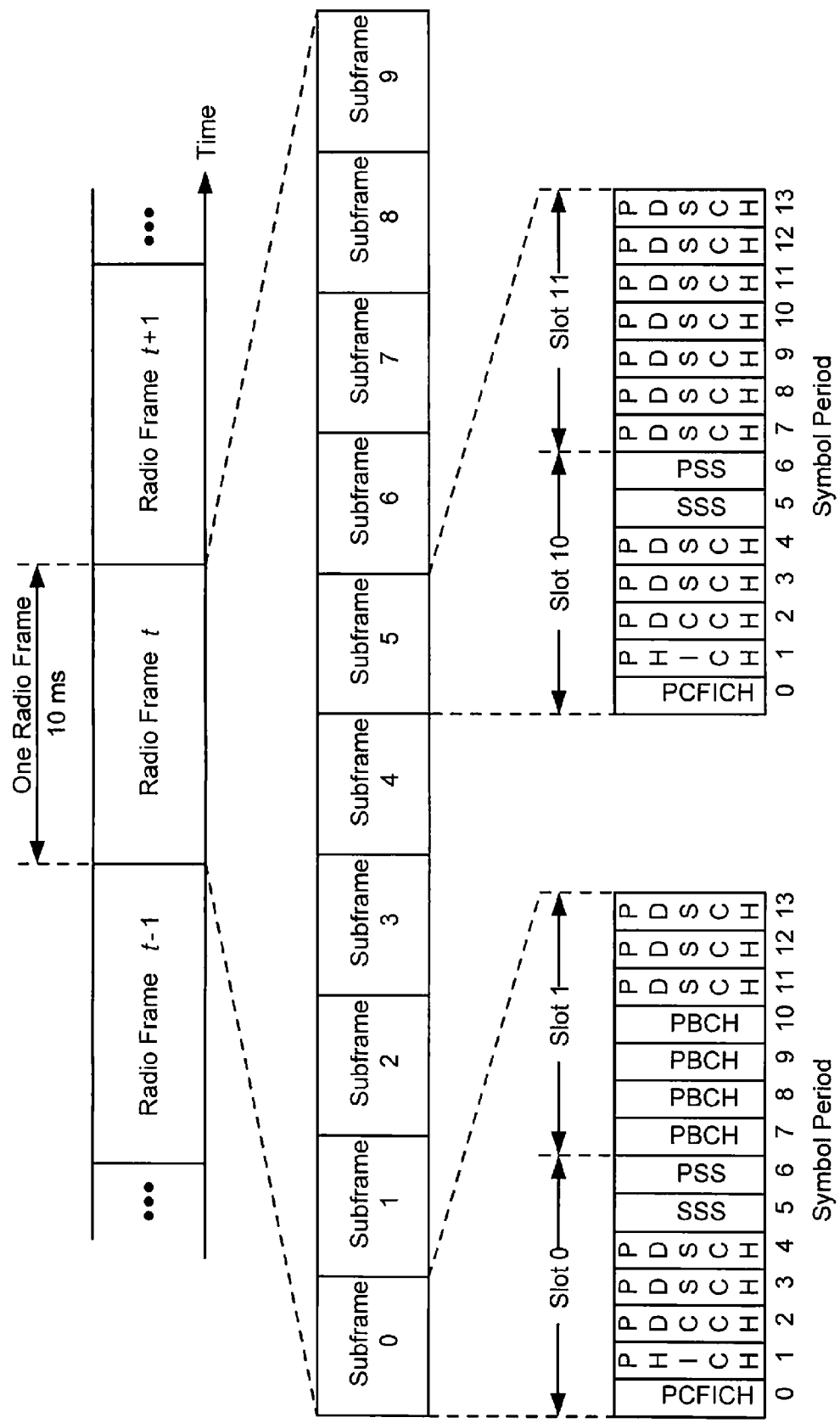
FIG. 2 is a block diagram conceptually illustrating an example of a down link frame structure in a telecommunications system.
Figure 6:
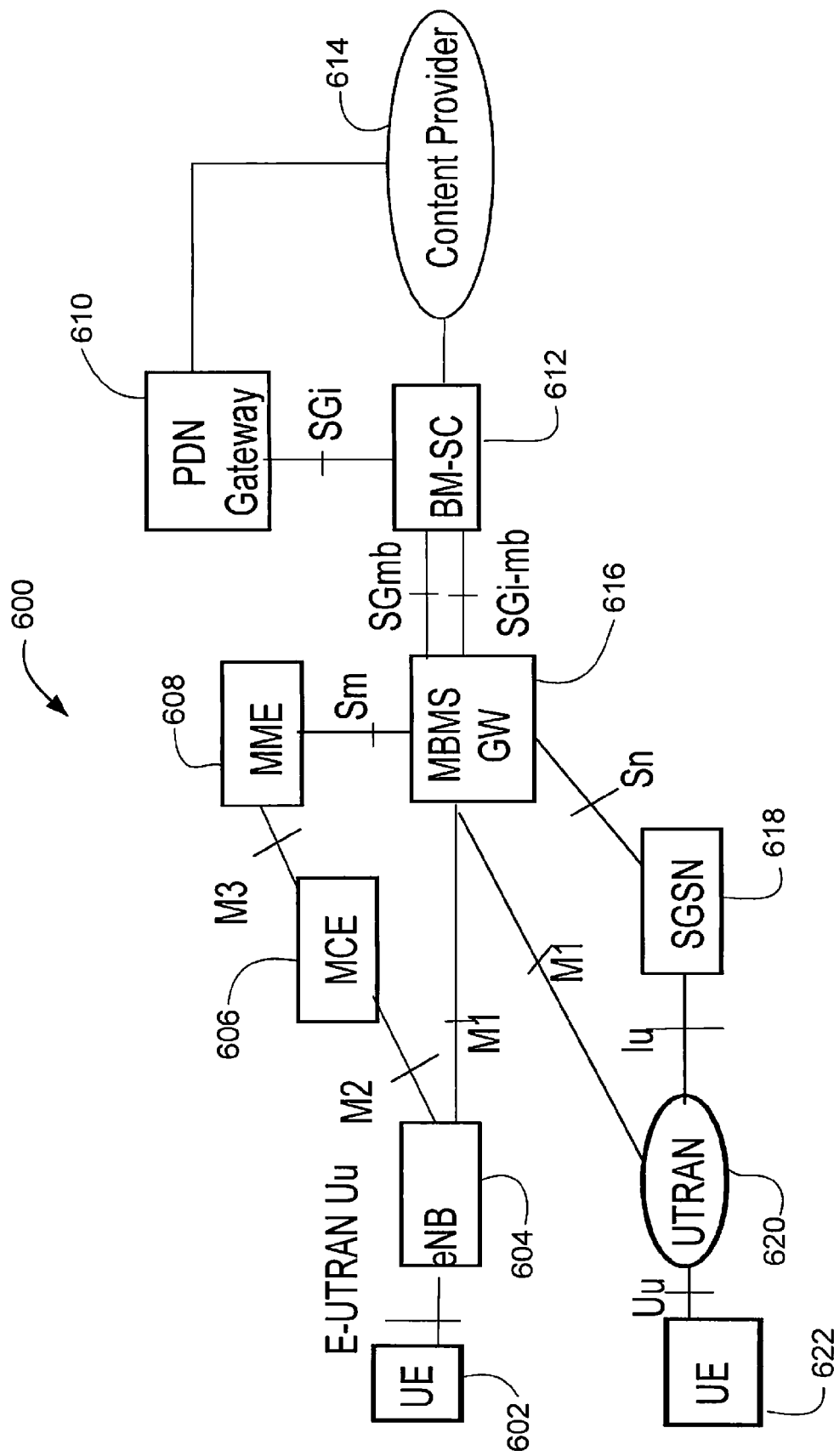
FIG. 6 is a block diagram illustrating components of a wireless communication system for providing or supporting MBSFN service.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
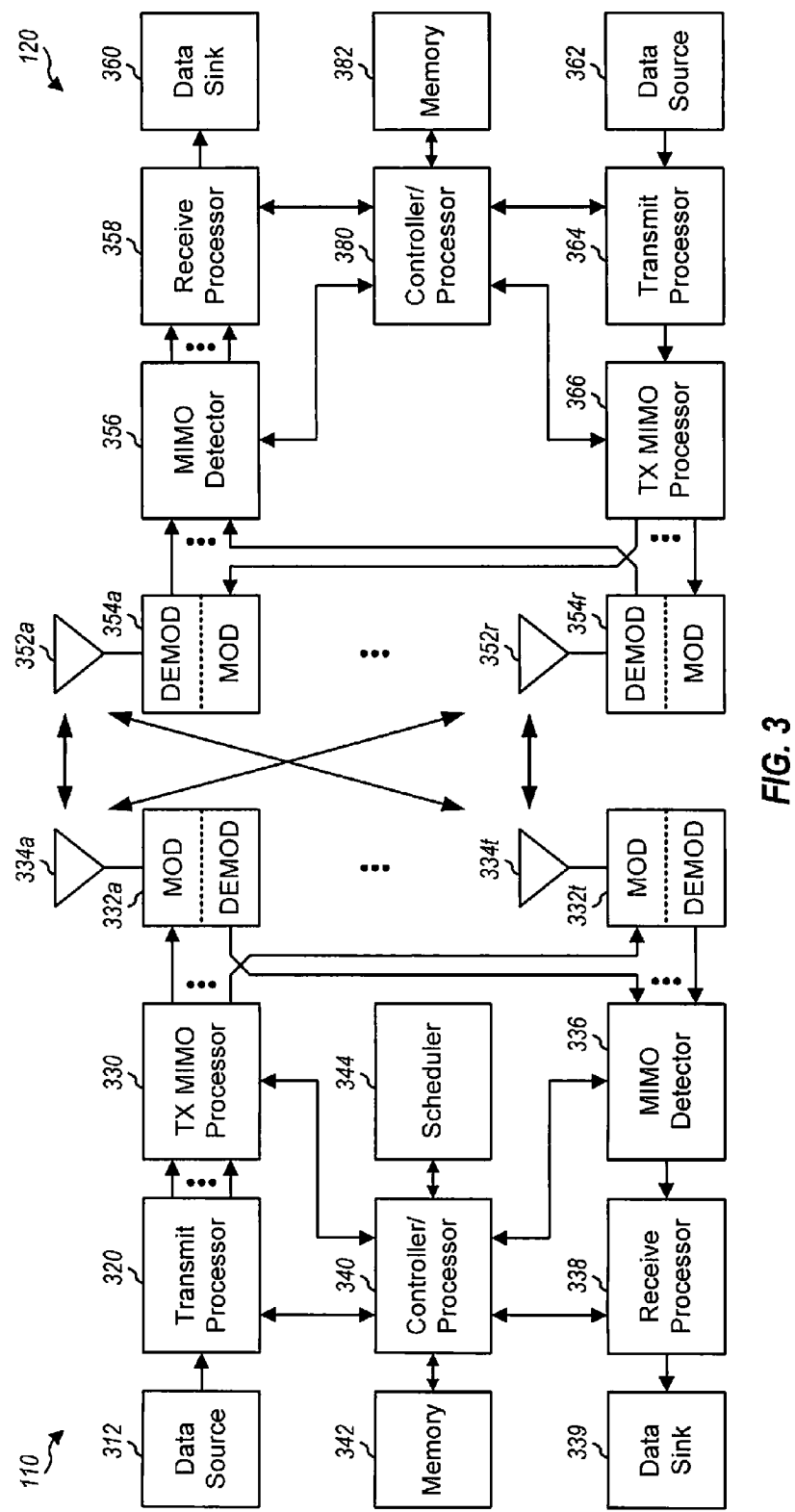
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIG. 9, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for receiving, by a modem processor of the UE, data packets of a data object from a broadcast-multicast service, means for buffering, by the modem processor, the received data packets without forwarding the buffered data packets to an application processor associated with the modem processor, means for determining, by the modem processor, an end of a segment of the data object, and means for forwarding, by the modem processor, in a single data burst, the buffered data packets to the application processor before the end of the segment. The UE 120 may also include means for signaling, by the application processor, the end of the current segment to the modem processor. In some configurations, the UE 120 may further include means for determining an end of a subsequent segment, means for setting a segment duration timer to a duration of the subsequent segment, and means for starting the segment duration timer upon the end of the current segment. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS AND UNICAST SIGNALING IN SINGLE FREQUENCY NETWORKS: One technique to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB(s) within radio range as part of the eMBMS service area or MBSFN area. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect a physical layer (PHY) of eMBMS for LTE Frequency Division Duplex (FDD), the channel structure may comprise time division multiplexing (TDM) resource partitioning between eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
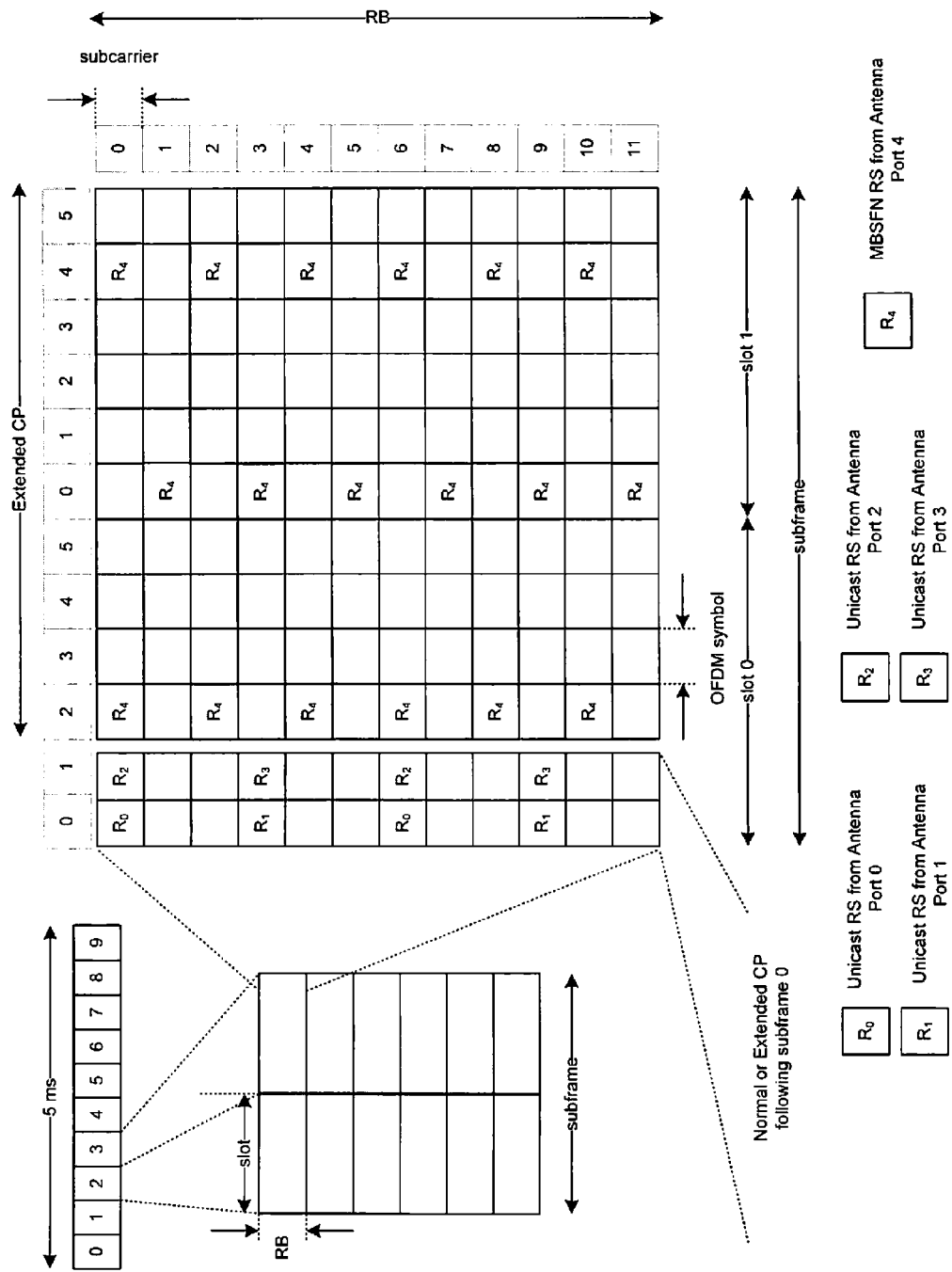
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 5:
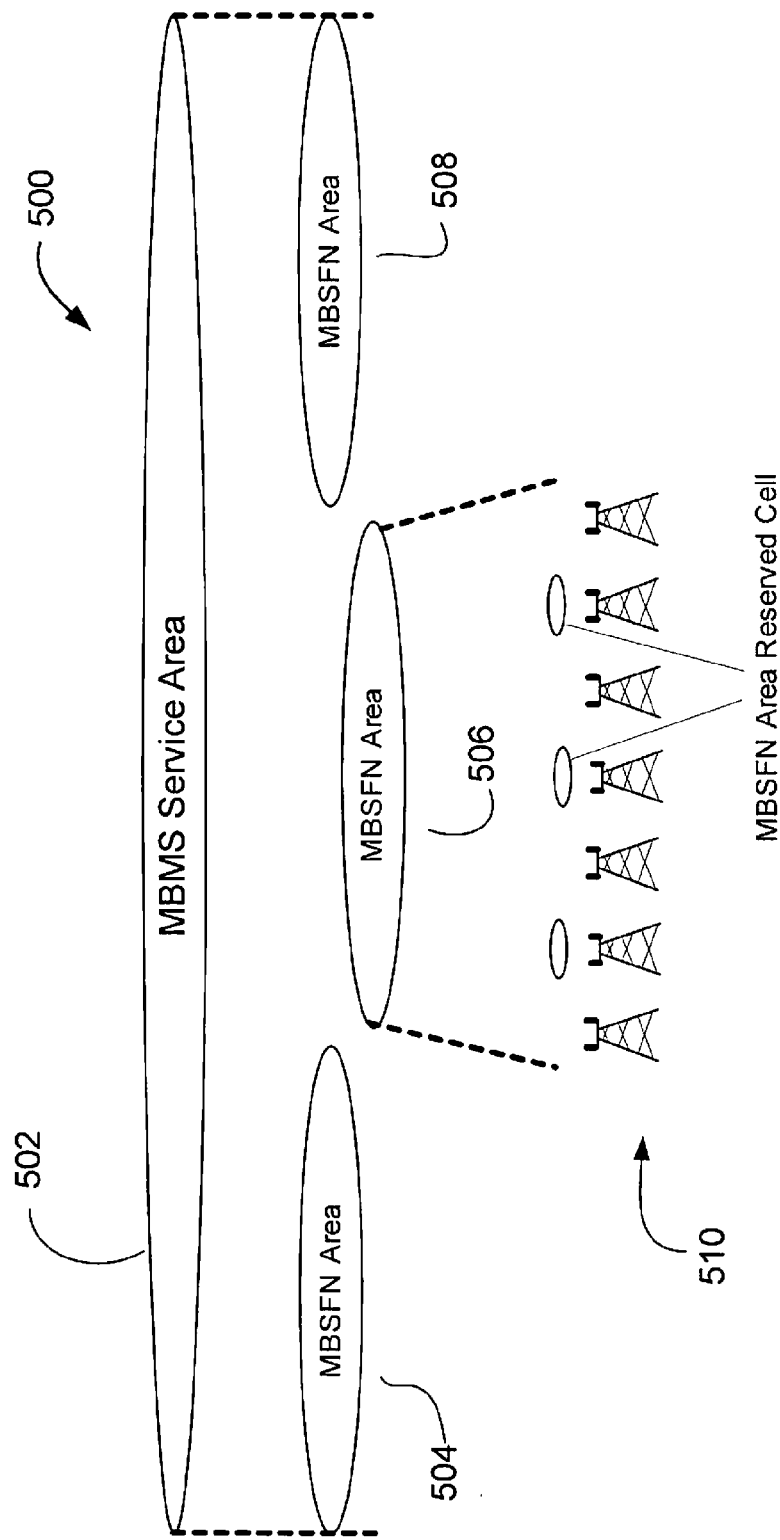
FIG. 5 is a diagram illustrating MBMS over a Single Frequency Network (MBSFN) areas within an MBSFN service area.

With continued reference to FIG. 4, within each eMBMS subframe, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe includes MBSFN RSs but not unicast RSs. The present technology is not limited to the particular frame allocation scheme illustrated by FIGS. 2 and 4, which are presented by way of example, and not by way of limitation. A multicast session or multicast broadcast as used herein may use any suitable frame allocation scheme.

eMBMS SERVICE AREAS: FIG. 5 illustrates a system 500 including an MBMS service area 502 encompassing multiple MBSFN areas 504, 506, 508. Each MBSFN area may include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer.

It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS SYSTEM COMPONENTS AND FUNCTIONS: FIG. 6 illustrates functional entities of a wireless communication system 600 for providing or supporting MBSFN service. Regarding Quality of Service (QoS), the system 600 may use a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNodeBs 604 via an M1 interface; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a user equipment (UE)/mobile entity 602 via an E-UTRAN Uu interface. The RNC 620 may provide MBMS content to a UE mobile entity 622 via a Uu interface. The MBMS GW 616 may further perform MBMS Session Control Signaling, for example MBMS session start and session stop, via the Mobility Management Entity (MME) 608 and Sm interface. The MBMS GW 616 may further provide an interface for entities using MBMS bearers through the SG-mb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function form MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 in communication with a content provider server 614. The BM-SC 612 may handle intake of multicast content from one or more sources such as the content provider 614, and provide other higher-level management functions as described below. These functions may include, for example, a membership function, including authorization and initiation of MBMS services for an identified UE. The BM-SC 612 may further perform MBMS session and transmission functions, scheduling of live broadcasts, and delivery, including MBMS and associated delivery functions. The BM-SC 612 may further provide service advertisement and description, such as advertising content available for multicast. A separate Packet Data Protocol (PDP) context may be used to carry control messages between UE and BM-SC. The BM-SC 612 may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Multicast Management Entity (MME) 608 in communication with the MCE 606 and MBMS-GW 616. The MME 608 may provide a control plane function for MBMS over E-UTRAN. In addition, the MME may provide the eNB 604, 620 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

Modern mobile devices may be configured with one or more processors dedicated for transmission, reception, and decoding operations, such as a modem processor, and another one or more processors dedicated for the higher application layer, such as an application processor. In some example mobile devices, the modem and application processors may be separate components or application-specific integrated circuits (ASICs), while on other example mobile devices, the modem and application processors may be integrated into the same integrated circuits, such as in System On Chip (SoC) configurations. In the latter case, the application and the modem application may be connected by a high speed bus.

Figure 7:
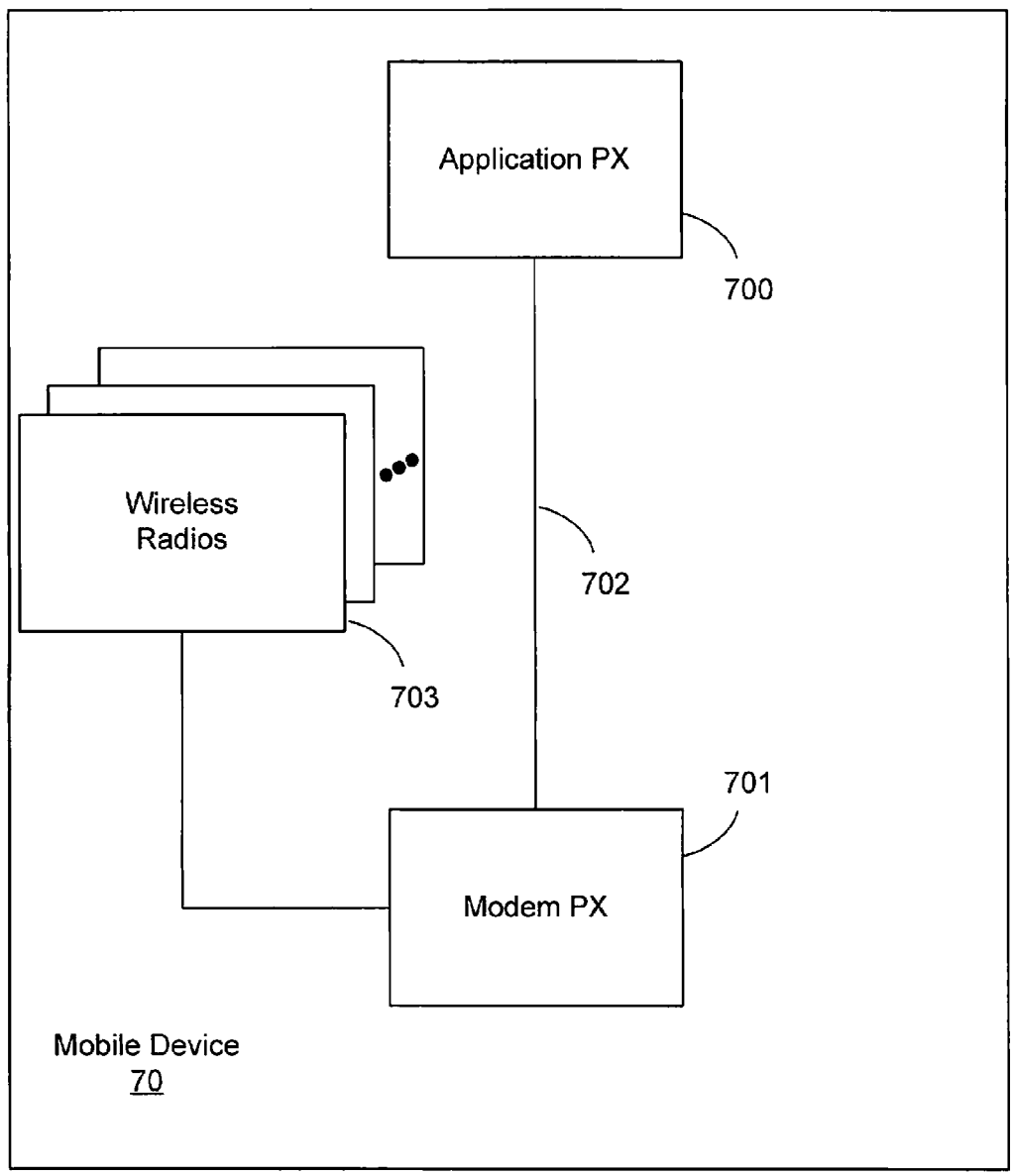
FIG. 7 is a block diagram illustrating a mobile device configured with application and modem processors.

FIG. 7 is a block diagram illustrating mobile device 70 configured with application processor 700 and modem processor 701. Mobile device 70 is configured in a SoC configuration with application processor 700 integrated into the same integrated circuit 704 as modem processor 701. Modem processor 701 will control and perform operations through wireless radios 703, including transmission and reception of data as well as coding/decoding and modulating/demodulating the data for transmission and reception.

In such SoC configuration, application processor 700 and modem processor 701 may be coupled via a high speed bus 702. A high speed bus is generally considered any connection between electronic components that allows data transfer over 1 Mbits/sec. High speed buses may be integrated into the same substrate as the integrated circuit components. Otherwise, if not integrated, a high speed bus may include a connection via a separate conductor path that allows for the level of high speed data transfer that would qualify as "high speed" (e.g., $\geq 1$ Mbits/s). Generally the modem processor is responsible for lower layer processing of a data stream received from a wireless network while the application layer processor is responsible for higher layer processing of the data stream.

Figure 8:
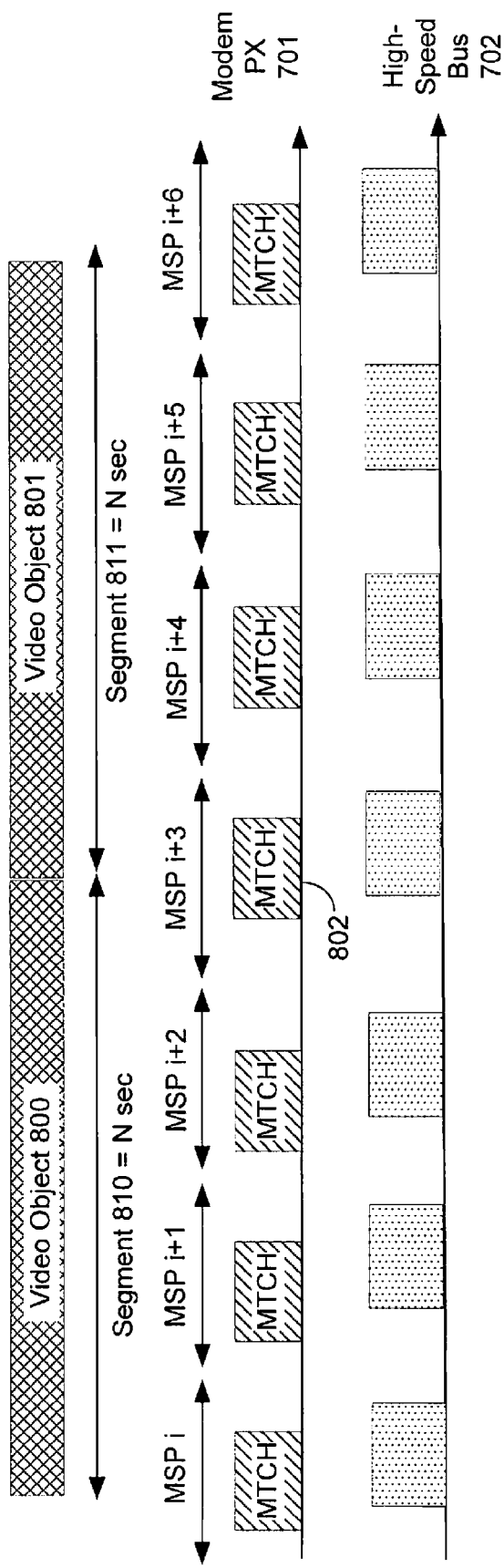
FIG. 8 is a block diagram illustrating a communication stream of a modem processor for eMBMS.

Data may be delivered via MBMS using a file download delivery method or a streaming delivery method. FIG. 8 is a block diagram illustrating delivery of continuous multimedia data (e.g., a video data stream) over an MBMS bearer that may be received by a modem processor 701. The streaming video data in a broadcast-multicast service may be broken into smaller data objects, and each of those data objects may be scheduled for delivery to the mobile device during segments of particular duration. As shown in the example of FIG. 8, video objects 800 and 801 are scheduled for delivery during segments 810 and 811, respectively, of duration N seconds. N may be various lengths of time, such as a number of whole seconds (e.g., 1, 2, 5, 10 sec, etc.), or a larger fraction of a second (e.g., 0.5, 0.75 sec, etc.) Each of video objects 800 and 801 may be further broken down into one or more data packets.

In eMBMS systems, a MBMS service is scheduled for downlink transmission over the transmission period on a corresponding MBMS traffic channel (MTCH). Over a given streaming video duration, multiple MCH scheduling periods (MSP) may be scheduled during which the service will broadcast the streaming video data using the MTCH to transmit the data packets of the streaming video data. In the example illustrated in FIG. 8, seven MSPs are scheduled, during which the data packets are transmitted on the MTCH associated with the selected eMBMS service. The MTCH is multiplexed on the physical channel for transmission, which results in the MTCH being transmitted in multiplexed segments during the MSPs. Thus, the MTCH is not transmitted continuously on the transmission resource. Each segment of MTCH with the MSPs may include transmission of multiple data symbols.

When the mobile device tunes to a broadcast-multicast service, the modem processor, such as modem processor 701, begins receiving and decoding the MTCH carrying a MBMS data transmission to recover data packets (e.g., Internet Protocol [IP] packets) with data symbols carried in the payload portion of the data packet. The modem processor then forwards the received, successfully decoded data packets to the application processor for further processing by a higher layer protocol, e.g., a file delivery over unidirectional transport (FLUTE) protocol. The transfer of the data packets from the modem processor to the application processor may be performed using a high speed bus, such as high speed bus 702. Transfer of the data packets to the application processor as they are received by the modem processor may increase power consumption in the mobile device for segments of large duration where the data object may be received by the modem processor over several packets.

For example, as illustrated in FIG. 8, as data packets are received by modem processor 701 in the MTCH during segment 810, the modem processor forwards the packets to application processor 700 using high speed bus 702. As illustrated, video object 800 is received during segment 810 over MSPs i, i+1, i+2, and i+3. As data packets are received by modem processor 701 during MSP i, the data packets are immediately forwarded to application processor 700 using high speed bus 702. Similarly, as data packets are received by modem processor 701 during MSPs i+1, i+2, and i+3, the data packets are immediately forwarded to application processor 700 using high speed bus 702. Since these four MSPs are within the duration of segment 810, there are at least four transmissions from the modem processor to the application processor over the high speed bus during segment 810. Such use of the high speed bus resource can result in increased power consumption.

MBMS data may also be delivered to a modem processor of a mobile device over a MBMS bearer using a file delivery method. In this method, the data object length may be equal to the length of the file. In such a case, the segment duration during which the data object is delivered to the mobile device may last until the entire file is received by the modem processor of the mobile device. Data symbols making up file object 802 may be transmitted during each transmission period of the MTCH within the MSP periods. When all of the symbols of the file have been transmitted, the modem processor 701 may stop the reception process.

Accordingly, various aspects of the present disclosure may provide power savings in the internal data transfer between the modem processor and the application processor, e.g., during eMBMS reception. Because eMBMS data may be broken down into data objects received during a segment duration, a mobile device configured according to various aspects of the present disclosure may be able to determine the end of the segment when transferring data from the modem processor to the application processor. By buffering the received data packets in the modem processor, and forwarding, in a single data burst, the buffered data packets to the application processor before the segment end, communication over the high speed bus may be reduced to conserve power and resources at the mobile device. In some aspects, the application processor waits until the end of the segment for all the data packets in the data object before processing the forwarded data packets.

Figure 9:
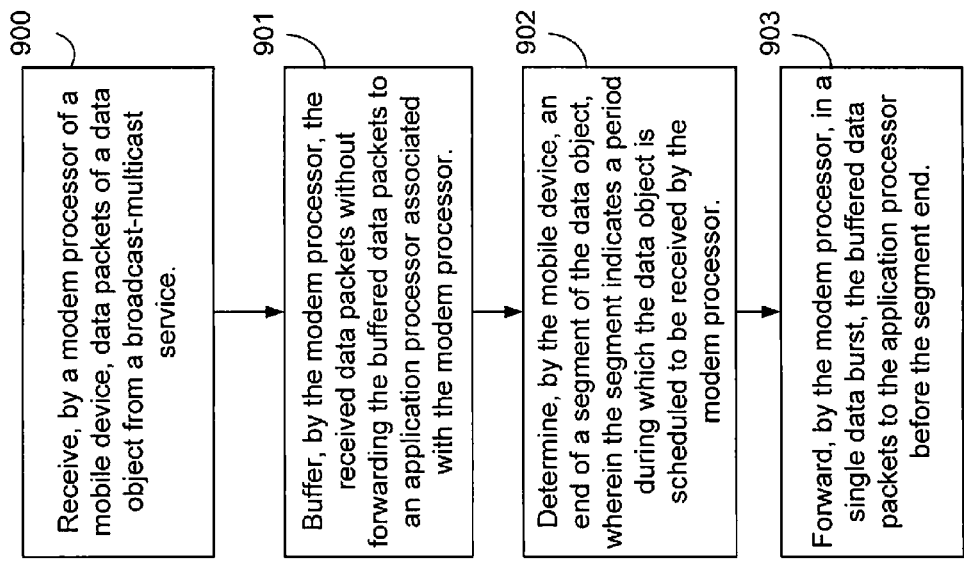
FIG. 9 is functional block diagram illustrating example blocks executed to implement one aspect of the present disclosure.

FIG. 9 is a block diagram illustrating example blocks executed to implement one aspect of the present disclosure. At block 900, a modem processor, such as modem processor 701, receives data packets of a data object from a broadcast-multicast service transmission. In some aspects, when the mobile device tunes to a broadcast-multicast service, the modem processor will begin receiving and decoding the MTCH carrying a MBMS data transmission to recover data packets (e.g., Internet Protocol [IP] packets) with data symbols carried in the payload portion of the data packet.

At block 901, the modem processor buffers the received data packets without forwarding the buffered data packets to an application processor, such as application processor 700. In some examples, the modem processor receives and decodes the data packets and stores the decoded data packets in memory. In some aspects, a logical packet buffer may be allocated in Random Access Memory (RAM) to store the received data packets.

At block 902, the modem processor determines an end of a segment of the data object. In some aspects, the end of the segment of the data objects indicates a period during which the data object is scheduled to be received by the modem processor. Example of such segments are segments 810 and 811, illustrated in FIG. 8.

A data object may be delivered to the mobile device over a time period of one or a few seconds. In aspects, the end of the segment of the data object may be determined by the modem processor obtaining an encoding symbol identifier (ESI), which may indicate an index of a current symbol of the data object transmitted in the data packet, from a header of one of the received data packets. Determining the end of the segment of the data object may also comprise obtaining a total number of symbols in the data object, and comparing the ESI to the total number of symbols to determine the end of the segment of the data object.

Thus, in aspects of the present disclosure, the end of a segment may be determined based on the index of the current symbol and the total number of symbols in the data object being received in the current segment. For example, where a data object comprises a total of 1500 symbols, and where the ESI indicates a current symbol index of 1000, then a mobile device can determine that 500 more symbols will be received and the segment end will occur in 500 symbols. Moreover, information contained in a file delivery table (FDT) associated with the broadcast-multicast service includes the encoding symbol length. Using this information, the segment end may be determined by multiplying the number of symbols left (which may be obtained by subtracting the ESI from the total number of symbols in the data object) by the encoding symbol length obtained from the FDT. Thus, the end of the current segment may be calculated according to Equation 1 below. The service data rate may be determined by the configuration of the service and stored in memory.

$$\text{Segment end} = \text{current time} + ((\text{total symbols} - \text{ESI}) * \text{symbol length})/\text{service data rate} \quad (1)$$

The example of 1500 total symbols in the data object is merely an example. A data object may include various numbers of symbols such as 600, 800, 1500, and the like.

Figure 10:
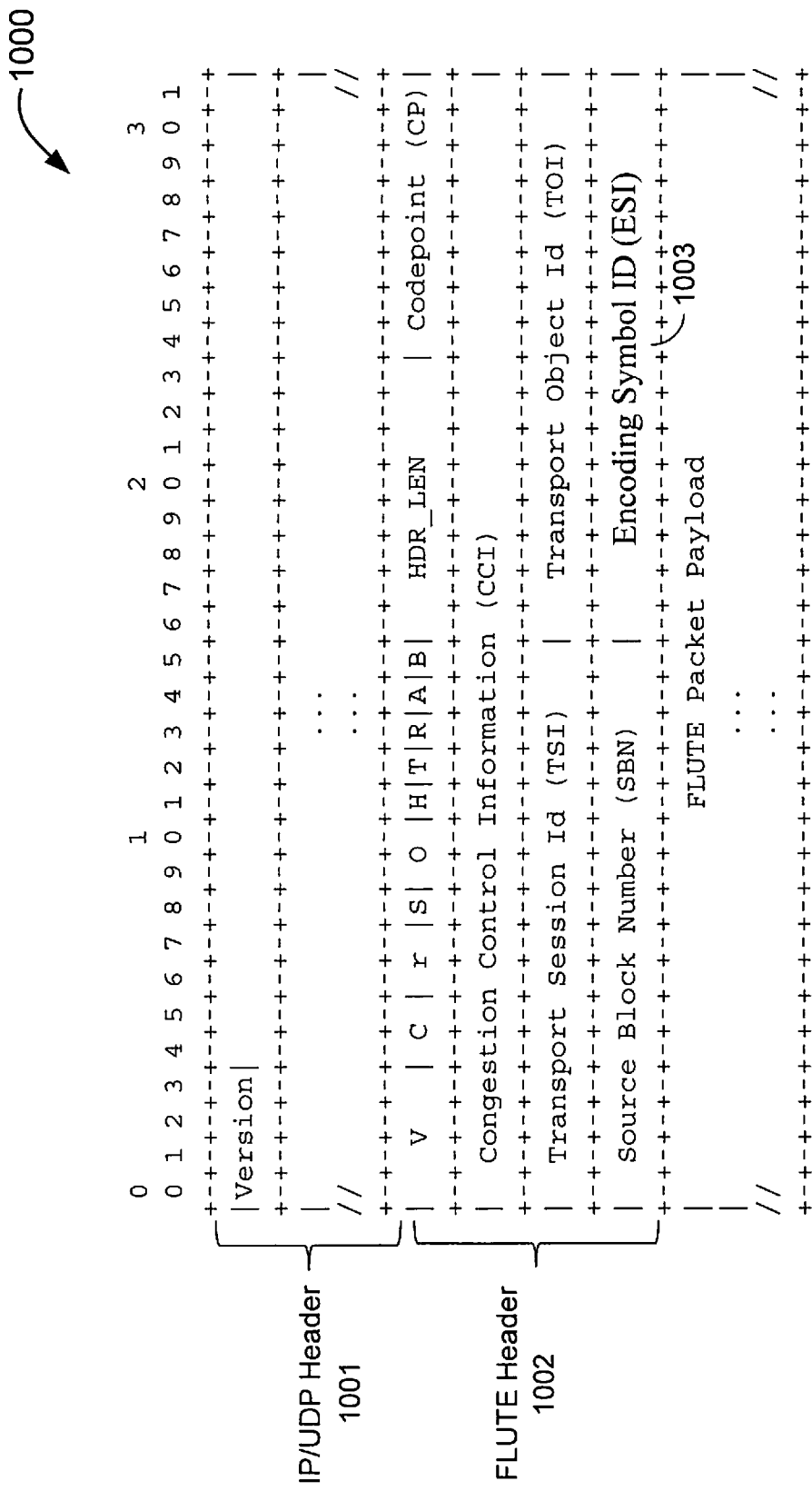
FIG. 10 is a block diagram illustrating an example data packet of a broadcast-multicast service transmission.

In some aspects, obtaining an ESI from a data packet header may be performed using deep packet inspection. With reference to FIG. 10, which shows a block diagram illustrating an example data packet 1000 of a broadcast-multicast service transmission, a modem processor, such as modem processor 701, may read through IP/UDP header 1001 into FLUTE header 1002 in order to obtain ESI 1003. ESI 1003 indicates the index of the current symbol of the data block transmitted in data packet 1000.

The total number of symbols in the data object may be obtained from the application processor by the modem processor. In such aspects, the application processor may read the FDT information to obtain the encoding symbol length. The application processor, using this information, may determine the number of total number of symbols in the data object by dividing the data packet size without any of the header bits (e.g., FLUTE, UDP, and IP header size bits) by the encoding symbol length. The application processor may then signal the total number of symbols to the modem processor.

Alternatively, the application processor may determine the total number of symbols in the data object by reading the encoding symbol length, transfer length, and forward error correction (FEC) redundancy level from the FDT. Using this information, the application processor may determine the total number of symbols per video object by dividing the transfer length multiplied by (1+FEC %) by the encoding symbol length. The result of the calculation corresponds to the total number of symbols in the data object, including source and redundancy symbols.

In aspects, the application processor may, through higher layer operations, read FLUTE header 1002 to obtain ESI 1003, and calculate the end of segment of a data object. In such aspects, the application processor may signal the end of the segment to the modem processor.

In some aspects, once the end of the current segment is determined, the end of a subsequent segment may be determined using a segment duration timer. In these aspects, the duration of a segment for an MBMS may be obtained from information in the FDT or in a user service description (USD) file maintained for the MBMS. Thus, with the end of the current segment detected, a segment duration timer is set to the duration of a segment, and, upon reaching the end of the current segment and thus, the beginning of the subsequent segment, the segment duration timer is started, expiring at the end of the subsequent segment. In aspects, the segment duration timer may count up to the segment duration or may count down after being set to the segment duration. The various aspects of the present disclosure are not limited to one such implementation of the timer mechanism.

At block 903 of FIG. 9, the modem processor forwards, in a single data burst, the buffered data packets to the application processor before the segment end. In some aspects, the buffered data packets are forwarded to the application processor near the end of the segment. It is noted that, in some aspects, the transferring of the data packets from the modem processor to the application processor may overlap into the subsequent segment.

In some aspects, the modem processor may determine that the end of the segment is near based on some threshold. The threshold may be a number of symbols remaining in the segment, or may be the number of symbols remaining in the segment as a percentage of the total number of symbols in the segment. For example, the modem processor may compare the ESI, which may indicate the index of the current symbol, to the total number of symbols in the data object being received during the segment to determine the number of symbols remaining to be received in the segment and to determine proximity to the end of the segment. The modem processor may determine that the end of the segment is near when the number of symbols remaining to be received is smaller than some threshold. In other aspects, the modem processor may determine that the end of the segment is near when the number of symbols received is greater than the threshold. The threshold may be expressed as a number of symbols, a percentage of total symbols in the segment, or some other value. For example, with a threshold of 100 symbols, the modem processor may determine that the end of the segment is near when 99 of a total of 1000 symbols remain to be received. Conversely, the threshold may be expressed as 10% of the total symbols. In another example, with a threshold of 900 symbols, or 90% of total symbols, the modem processor may determine that the end of the segment is near when 900 of a total of 1000 symbols have been received. In other aspects, the threshold may be based on a number of bytes remaining in the segment, or based on the time remaining in the segment. In these other aspects, whether the end of segment is near may be determined based on the remaining bytes, or time, being less than the threshold, or based on the number, or percentage, of the received bytes being greater than the threshold. The threshold may be any percentage, such as any percentage between 1%-30%, and may be any other percentage determined by operational requirements.

Figure 11:
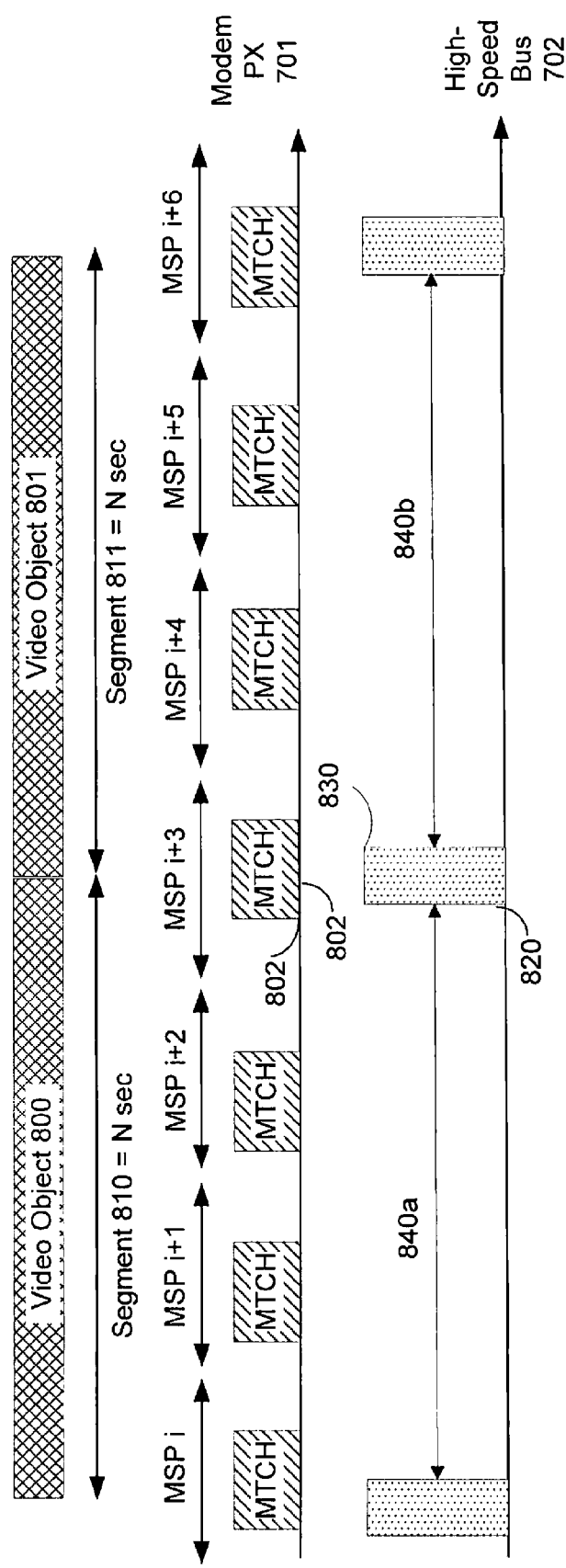
FIG. 11 is a block diagram illustrating a communication stream of a modem processor configured according to aspects of the present disclosure.

FIG. 11 is a block diagram illustrating communication streams of application processor 700 and modem processor 701 configured according to one aspect of the present disclosure. Application processor 700 and modem processor 701 are coupled via high speed bus 702 (FIG. 7). By reducing usage of the high speed bus during the transfer of data between the modem processor and the application processor, aspects of the disclosure may result in conservation of resources and power, as well as processing time. As FIG. 11 illustrates, data packets of video object 800 are received by modem processor 701 in the MTCH transmission period during segment 810. Instead of forwarding the data packets to the application processor as they are received, the modem processor buffers the received data packets without forwarding the buffered data packets to the application processor. Near the end of segment 810, at time 820, the modem processor forwards, in single data burst 830, the buffered data packets using high speed bus 702. Thus, high speed data bus is used for the duration of each single data burst. In this aspect, the high speed bus resource is conserved during periods 840a and 840b.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) and any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a modem processor of a mobile device, data packets of a data object from a broadcast-multicast service;
   buffering, by the modem processor, the received data packets without forwarding the buffered data packets to an application processor associated with the modem processor;
   determining, by the modem processor, an end of a current segment of the data object, wherein the current segment indicates a period during which the data object is scheduled to be received by the modem processor;
   determining an end of a subsequent segment, wherein the determining the end of the subsequent segment comprises:
      setting a segment duration timer to a duration of the subsequent segment;
      starting the segment duration timer upon the end of the current segment; and
      setting the end of the subsequent segment to be the expiration of the segment duration timer; and
   forwarding, by the modem processor, in a single data burst, the buffered data packets to the application processor before the end of the current segment.

2. The method of claim 1, wherein the application processor processes the forwarded buffered data packets only after the end of the current segment.

3. The method of claim 1, wherein the mobile device is in idle mode.

4. The method of claim 1, wherein the determining the end of the current segment comprises:
   obtaining an encoding symbol identifier (ESI) from a header of at least one of the received data packets, wherein the ESI indicates an index of a current symbol of the data object transmitted in at least one of the received data packets;
   obtaining a total number of symbols in the data object; and
   comparing the ESI to the total number of symbols to determine the end of the current segment.

5. The method of claim 4, wherein the obtaining the total number of symbols comprises obtaining the total number of symbols from the application processor.

6. The method of claim 1, wherein the determining the end of the current segment comprises:
   determining the end of the current segment by the application processor; and
   signaling, by the application processor, the end of the current segment to the modem processor.

7. The method of claim 1, wherein the forwarding comprises forwarding, by the modem processor, in a single data burst, the buffered data packets to the application processor near the end of the current segment.

8. The method of claim 7, wherein the near the end of the current segment is determined based on a percentage of symbols remaining to be received by the modem processor.

9. An apparatus configured for wireless communication, comprising:
   means for receiving, by a modem processor, data packets of a data object from a broadcast-multicast service;

means for buffering, by the modem processor, the received data packets without forwarding the buffered data packets to an application processor associated with the modem processor;

means for determining, by the modem processor, an end of a current segment of the data object, wherein the current segment indicates a period during which the data object is scheduled to be received by the modem processor;

means for determining an end of a subsequent segment, wherein the determination of the end of the subsequent segment comprises:

the segment duration timer being set to a duration of the subsequent segment;

the segment duration timer being started upon the end of the current segment; and the end of the subsequent segment being set to be the expiration of the segment duration timer; and means for forwarding, by the modem processor, in a single data burst, the buffered data packets to the application processor before the end of the current segment.

10. The apparatus of claim 9, wherein the application processor processes the forwarded buffered data packets only after the end of the current segment.

11. The apparatus of claim 9, wherein the apparatus is in idle mode.

12. The apparatus of claim 9, wherein the means for determining the end of the current segment comprises:

means for obtaining an encoding symbol identifier (ESI) from a header of at least one of the received data packets, wherein the ESI indicates an index of a current symbol of the data object transmitted in at least one of the received data packets;

means for obtaining a total number of symbols in the data object; and means for comparing the ESI to the total number of symbols to determine the end of the current segment.

13. The apparatus of claim 12, wherein the means for obtaining the total number of symbols comprises means for obtaining the total number of symbols from the application processor.

14. The apparatus of claim 9, wherein the means for determining the end of the current segment comprises:

means for determining the end of the current segment by the application processor; and means for signaling, by the application processor, the end of the current segment to the modem processor.

15. The apparatus of claim 9, wherein the means for forwarding comprises means for forwarding, by the modem processor, in a single data burst, the buffered data packets to the application processor near the end of the current segment.

16. The apparatus of claim 15, wherein the near the end of the current segment is determined based on a percentage of symbols remaining to be received by the modem processor.

17. A non-transitory computer-readable medium having program code recorded thereon, the program code comprising:

program code for receiving, by a modem processor, data packets of a data object from a broadcast-multicast service;

program code for buffering, by the modem processor, the received data packets without forwarding the buffered data packets to an application processor associated with the modem processor;

program code for determining, by the modem processor, an end of a current segment of the data object, wherein the current segment indicates a period during which the data object is scheduled to be received by the modem processor;

program code for determining an end of a subsequent segment, wherein the program code for determining the end of the subsequent segment comprises:

program code for setting a segment duration timer to a duration of the subsequent segment;

program code for starting the segment duration timer upon the end of the current segment; and program code for setting the end of the subsequent segment to be the expiration of the segment duration timer; and program code for forwarding, by the modem processor, in a single data burst, the buffered data packets to the application processor before the end of the current segment.

18. The non-transitory computer-readable medium of claim 17, wherein the program code for determining the end of the current segment comprises:

program code for obtaining an encoding symbol identifier (ESI) from a header of at least one of the received data packets, wherein the ESI indicates an index of a current symbol of the data object transmitted in at least one of the received data packets;

program code for obtaining a total number of symbols in the data object; and program code for comparing the ESI to the total number of symbols to determine the end of the current segment.

19. The non-transitory computer-readable medium of claim 17, wherein the program code for determining the end of the current segment comprises:

program code for determining the end of the current segment by the application processor; and program code for signaling, by the application processor, the end of the current segment to the modem processor.

20. The non-transitory computer-readable medium of claim 17, wherein the program code for forwarding comprises program code for forwarding, by the modem processor, in a single data burst, the buffered data packets to the application processor near the end of the current segment, wherein the near the end of the current segment is determined based on a percentage of symbols remaining to be received by the modem processor.

21. An apparatus configured for wireless communication, the apparatus comprising:

at least one processor; and a memory coupled to the at least one processor, wherein the at least one processor is configured:

to receive, by a modem processor, data packets of a data object from a broadcast-multicast service;

to buffer, by the modem processor, the received data packets without forwarding the buffered data packets to an application processor associated with the modem processor;

to determine, by the modem processor, an end of a current segment of the data object, wherein the current segment indicates a period during which the data object is scheduled to be received by the modem processor;

to determine an end of a subsequent segment, wherein the at least one processor being configured to determine the end of the subsequent segment comprises configuration of the at least one processor:

to set a segment duration timer to a duration of the subsequent segment;
to start the segment duration timer upon the end of the current segment; and
to set the end of the subsequent segment to be the expiration of the segment duration timer; and
to forward, by the modem processor, in a single data burst, the buffered data packets to the application processor before the end of the current segment.

22. The apparatus of claim 21, wherein the at least one processor being configured to determine the end of the current segment comprises configuration of the at least one processor:
to obtain an encoding symbol identifier (ESI) from a header of at least one of the received data packets, wherein the ESI indicates an index of a current symbol of the data object transmitted in at least one of the received data packets;
to obtain a total number of symbols in the data object; and
to compare the ESI to the total number of symbols to determine the end of the current segment.

23. The apparatus of claim 21, wherein the at least one processor being configured to determine the end of the current segment comprises configuration of the at least one processor:
to determine the end at the current segment by the application processor; and
to signal, by the application processor, the end of the current segment to the modem processor.

24. The apparatus of claim 21, wherein the at least one processor is configured to forward, by the modem processor, in a single data burst, the buffered data packets to the application processor near the end of the current segment, wherein the near the end of the current segment is determined based on a percentage of symbols remaining to be received by the modem processor.

* * * * *